US012637032B1

(12) United States Patent
Betts et al.

(10) Patent No.: US 12,637,032 B1
(45) Date of Patent: May 26, 2026

(54) VEHICLE ALIGNMENT GAUGE FIXTURE

(71) Applicant: Rivian IP Holdings, LLC, Irvine, CA (US)

(72) Inventors: Matthew Robert Betts, Clarkston, MI (US); Luz Kenia Lopez Ramos, Bloomington, IL (US); Antonio Zamora Sanchez, Bloomington, IL (US); Sergio Antonio Flores Jimenez, Bloomington, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/239,248

(22) Filed: Jun. 16, 2025

(51) Int. Cl.
| | |
|---|---|
| *B60S 5/00* | (2006.01) |
| *B62D 7/16* | (2006.01) |
| *B62D 7/18* | (2006.01) |
| *B62D 17/00* | (2006.01) |
| *G01B 21/26* | (2006.01) |

(52) U.S. Cl.
CPC ............... *B60S 5/00* (2013.01); *B62D 17/00* (2013.01); *G01B 21/26* (2013.01); *B62D 7/16* (2013.01); *B62D 7/18* (2013.01)

(58) Field of Classification Search
CPC .. B60S 5/00; B62D 17/00; B62D 7/16; B62D 7/18; G01B 21/26; B60G 3/265
See application file for complete search history.

(56) References Cited

U.S. PATENT DOCUMENTS 12,441,142 B1 * 10/2025 Bromley ................ B60G 3/265

* cited by examiner

*Primary Examiner* — Lee A Holly
(74) *Attorney, Agent, or Firm* — Patterson + Sheridan, LLP

(57) ABSTRACT

A gauge fixture includes a chassis and a plurality of wheels mounted to the chassis. For each wheel, the gauge fixture includes a steering knuckle mounted to the wheel and a first member, a first end of the first member being mounted to the steering knuckle. The gauge fixture further includes, for each wheel, an adjustment stage mounted to the chassis, a second end of the first member being mounted to the adjustment stage, the adjustment stage configured to adjust a position of the second end of the first member relative to the chassis to change alignment of each wheel included in the plurality of wheels relative to the chassis, the adjustment stage including an indicator indicating a position of the second end of the first member relative to the chassis. Values from indicators and measured values from alignment sensors are used to calibrate the alignment sensors.

20 Claims, 11 Drawing Sheets

VEHICLE ALIGNMENT GAUGE FIXTURE

INTRODUCTION

The present disclosure relates to a vehicle alignment gauge fixture.

SUMMARY

In one aspect, a gauge fixture includes a chassis and a plurality of adjustment assemblies mounted to the chassis. Each adjustment assembly includes a steering knuckle configured to mount a wheel and a first member, a first end of the first member being mounted to the steering knuckle. The adjustment assembly further includes an adjustment stage mounted to the chassis, a second end of the first member being mounted to the adjustment stage, the adjustment stage configured to adjust a position of the second end of the first member relative to the chassis to change alignment of the steering knuckle relative to the chassis, the adjustment stage including an indicator indicating a position of the second end of the first member relative to the chassis.

In another aspect, a method for alignment sensor testing includes positioning a gauge fixture relative to one or more wheel alignment sensors. The gauge fixture includes a chassis and a plurality of wheels mounted to the chassis. For each wheel, the gauge fixture includes a steering knuckle mounted to the wheel and a first member, a first end of the first member being mounted to the steering knuckle. An adjustment stage is mounted to the chassis, a second end of the first member being mounted to the adjustment stage, the adjustment stage configured to adjust a position of the second end of the first member relative to the chassis to change alignment of each wheel included in the plurality of wheels relative to the chassis, the adjustment stage including an indicator indicating a position of the second end of the first member relative to the chassis. The method includes adjusting the position of the second end of the first member relative to the chassis for one or more wheels of the plurality of wheels and reading the indicator to obtain a measurement for each wheel of the one or more wheels. The method includes measuring the plurality of wheels using the one or more wheel alignment sensors to obtain measurements and calibrating the one or more wheel alignment sensors according to the measurement for each wheel of the one or more wheels.

In another aspect, a gauge fixture includes a chassis and a plurality of wheels mounted to the chassis. The gauge fixture includes, for each wheel of the plurality of wheels, a steering knuckle mounted to the wheel and a first member, a first end of the first member being mounted to the steering knuckle. The gauge fixture includes an adjustment stage mounted to the chassis, a second end of the first member being mounted to the adjustment stage, the adjustment stage configured to adjust a position of the second end of the first member relative to the chassis to change alignment of each wheel included in the plurality of wheels relative to the chassis, the adjustment stage including an indicator indicating a position of the second end of the first member relative to the chassis.

DETAILED DESCRIPTION

Part of the assembly process of a vehicle is verification and/or adjustment of the alignment of the wheels of the vehicle. To that end, the vehicle is brought to a sensor station that measures toe and camber for all wheels and caster for steered wheels. The sensors of the sensor station are periodically calibrated to ensure accurate measurement.

An alignment gauge fixture described herein includes a chassis and wheels. The wheels are connected to the chassis by adjustment stages enabling the toe and camber of all wheels and caster for steered wheels to be set. Each adjustment stage includes a locking mechanism enabling the state of the adjustment stage to be fixed and an indicator enabling the state of the alignment gauge fixture to be read and compared to outputs of the sensor station.

Figure 1A:
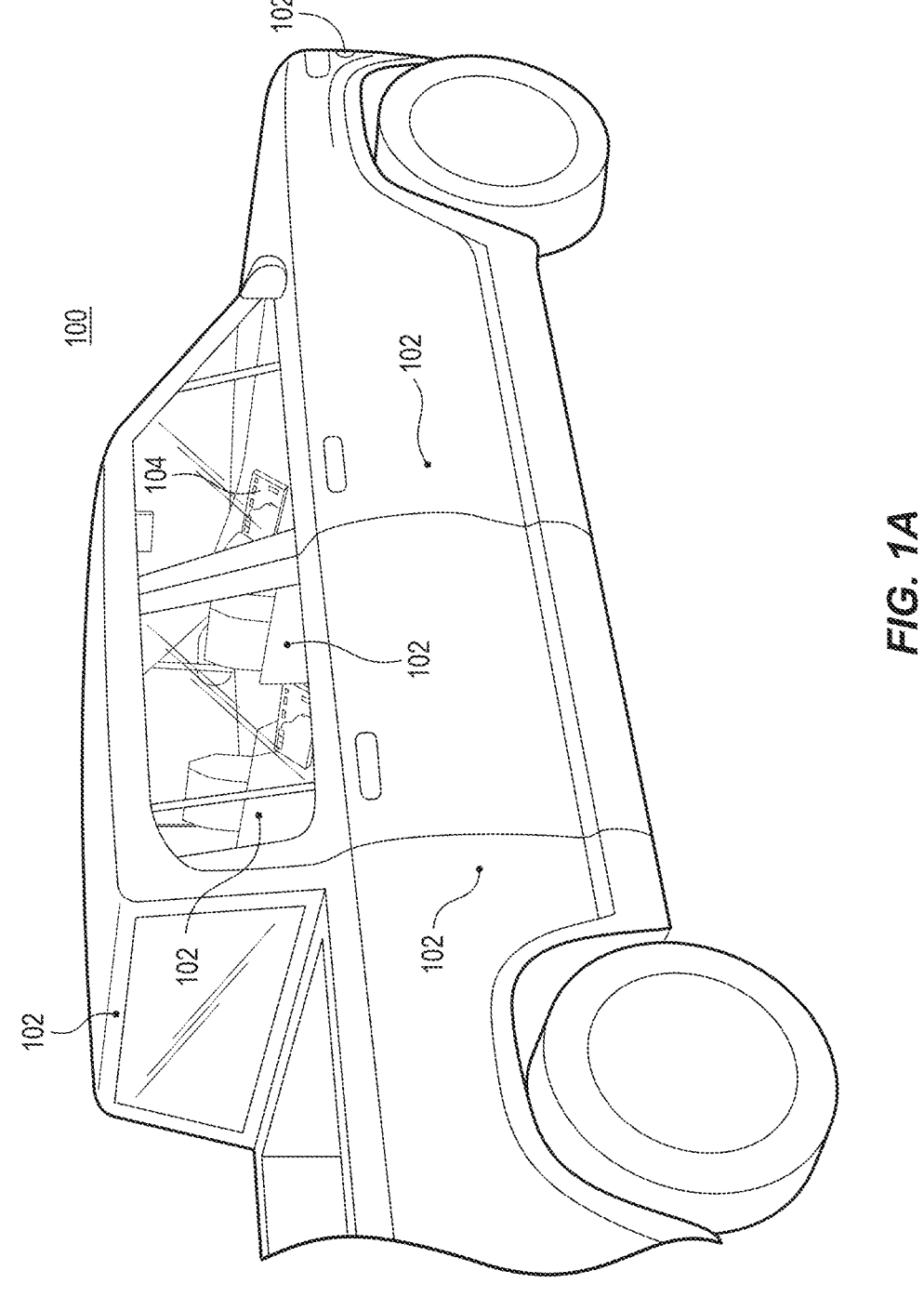
FIG. 1A illustrates an example vehicle in accordance with certain embodiments.

FIG. 1A illustrates an example vehicle 100. As seen in FIG. 1A, the vehicle 100 has multiple exterior cameras 102 and one or more front displays 104. Each of these exterior cameras 102 may capture a particular view or perspective on the outside of the vehicle 100. The images or videos captured by the exterior cameras 102 may then be presented on one or more displays in the vehicle 100, such as the one or more front displays 104, for viewing by a driver.

Figure 1B:
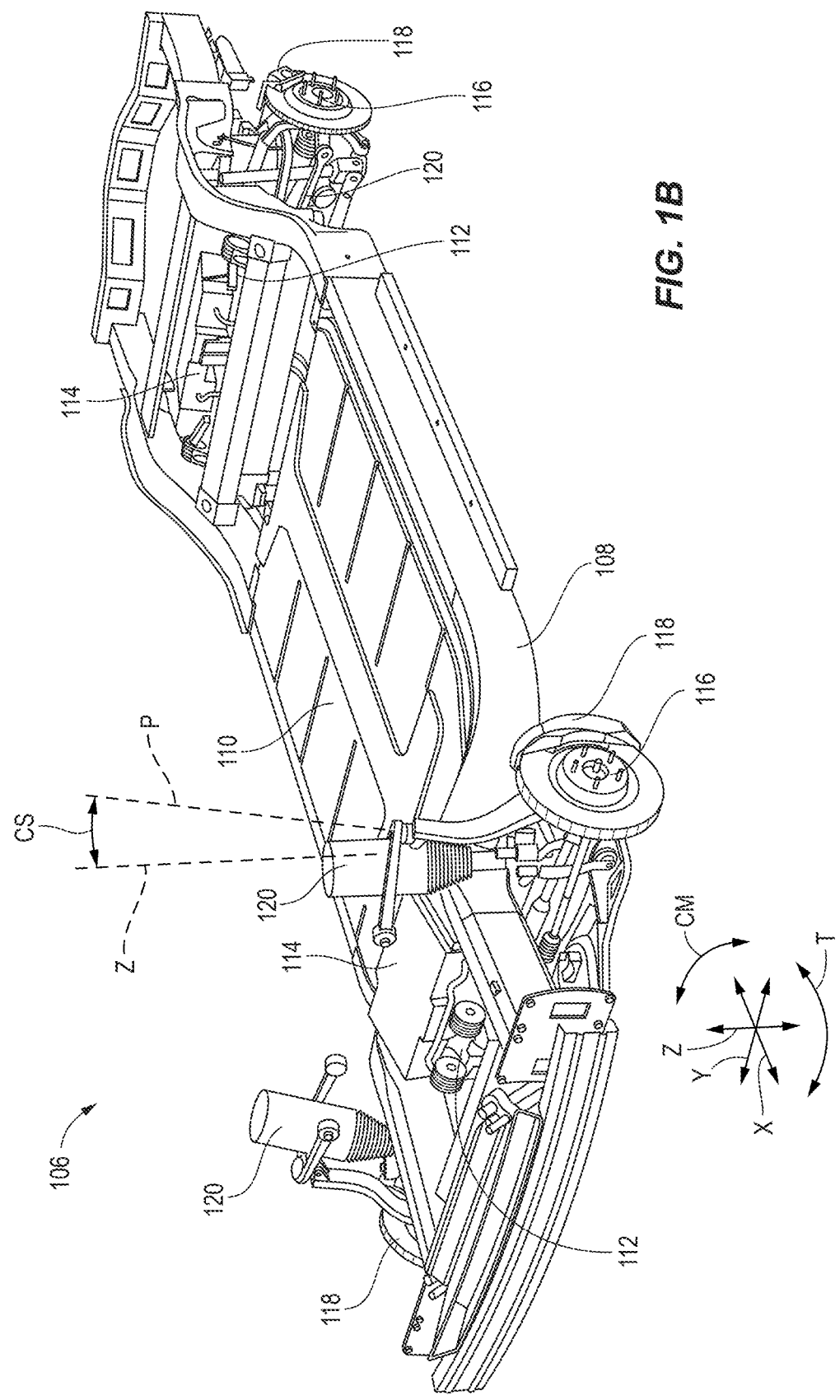
FIG. 1B illustrates a chassis of a vehicle in accordance with certain embodiments.

Referring to FIG. 1B, the vehicle 100 may include a chassis 106 including a frame 108 providing a primary structural member of the vehicle 100. The frame 108 may be formed of one or more beams or other structural members or may be integrated with the body of the vehicle (i.e., unibody construction).

In embodiments where the vehicle 100 is a battery electric vehicle (BEV) or possibly a hybrid vehicle, a large battery 110 is mounted to the chassis 106 and may occupy a substantial (e.g., at least 80 percent) of an area within the frame 108. For example, the battery 110 may store from 100 to 200 kilowatt hours (kWh). The battery 110 may be a lithium-ion battery or other type of rechargeable battery. The battery may be substantially planar in shape.

Power from the battery 110 may be supplied to one or more drive units 112. Each drive unit 112 may be formed of an electric motor and possibly a gear reduction drive. In some embodiments, there is a single drive unit 112 driving either the front wheels or the rear wheels of the vehicle 100.

In another embodiment, there are two drive units 112, each driving either the front wheels or the rear wheels of the vehicle 100. In yet another embodiment, there are four drive units 112, each drive unit 112 driving one of four wheels of the vehicle 100.

Power from the battery 110 may be supplied to the one or more drive units 112 by one or more sets of power electronics 114. The power electronics 114 may include inverters configured to convert direct current (DC) from the battery 110 into alternating current (AC) supplied to the motors of the one or more drive units 112.

The one or more drive units 112 are coupled to two or more hubs 116 to which wheels may mount. Each hub 116 includes a corresponding brake 118, such as the illustrated disc brakes. The one or more drive units 112 or other component may also provide regenerative braking. Each hub 116 is further coupled to the frame 108 by a suspension 120. The suspension 120 may include metal or pneumatic springs for absorbing impacts. The suspension 120 may be implemented as a pneumatic or hydraulic suspension capable of adjusting a ride height of the chassis 106 relative to a support surface. The suspension 120 may include a damper with the properties of the damper being either fixed or adjustable electronically.

In the embodiment of FIGS. 1B and 1$n$ the discussion below, the vehicle 100 is a battery electric vehicle. However, the systems and methods disclosed herein may be used for any type of vehicle, including vehicles powered by an internal combustion engine (ICE), hybrid drivetrain, hydrogen fuel cell drivetrain, or other type of drivetrain.

The hubs 116 and corresponding wheels secured thereto are preferably aligned to ensure safe handling and reduce tire wear. The alignment of the hubs 116 may be understood with respect to X, Y, and Z directions that are mutually perpendicular. The X direction may be defined as the direction of travel of the vehicle 100 when traveling in a straight line, the Z direction may be understood as the direction of gravity when the vehicle 100 is on a flat support surface.

A toe angle T of a hub 116 may be understood as an angle of the axis of rotation of the hub 116 in the X-Z plane. Zero toe angle T corresponds to the axis of rotation of the hub 16 parallel to the X axis or, stated differently, the wheel rotating in the X-Z plane. A camber angle CM may be defined as an angle of the axis of rotation of the hub 116 in the Y-Z plane. Zero camber angle CM may likewise be defined as the axis of rotation of the hub 116 being parallel to the X axis.

For steered wheels, e.g., the front wheels in a front steered vehicles or all wheels in an all-wheel steered vehicle, a caster angle CS may be defined. The caster angle CS is the angle of the pivot axis P about which the hub 116 pivots when steered. Zero caster angle CS may be defined as the pivot axis P being parallel to the Z direction. In general, the caster angle CS may be varied in the X-Z plane, though the caster angle may have an out-of-plane component.

For a given vehicle design, the toe angle T, camber angle CM, and caster angle CS are parameters defined for a given vehicle model to provide safe handling and reduce tire wear. Part of the manufacture of a vehicle 100 may include verifying and/or adjusting to angle T, camber angle CM, and caster angle CS of the vehicle. To that end, the vehicle 100 may be placed in a sensor station measuring these angles. The sensors of the sensor station may be periodically calibrated to ensure proper function.

Figure 2:
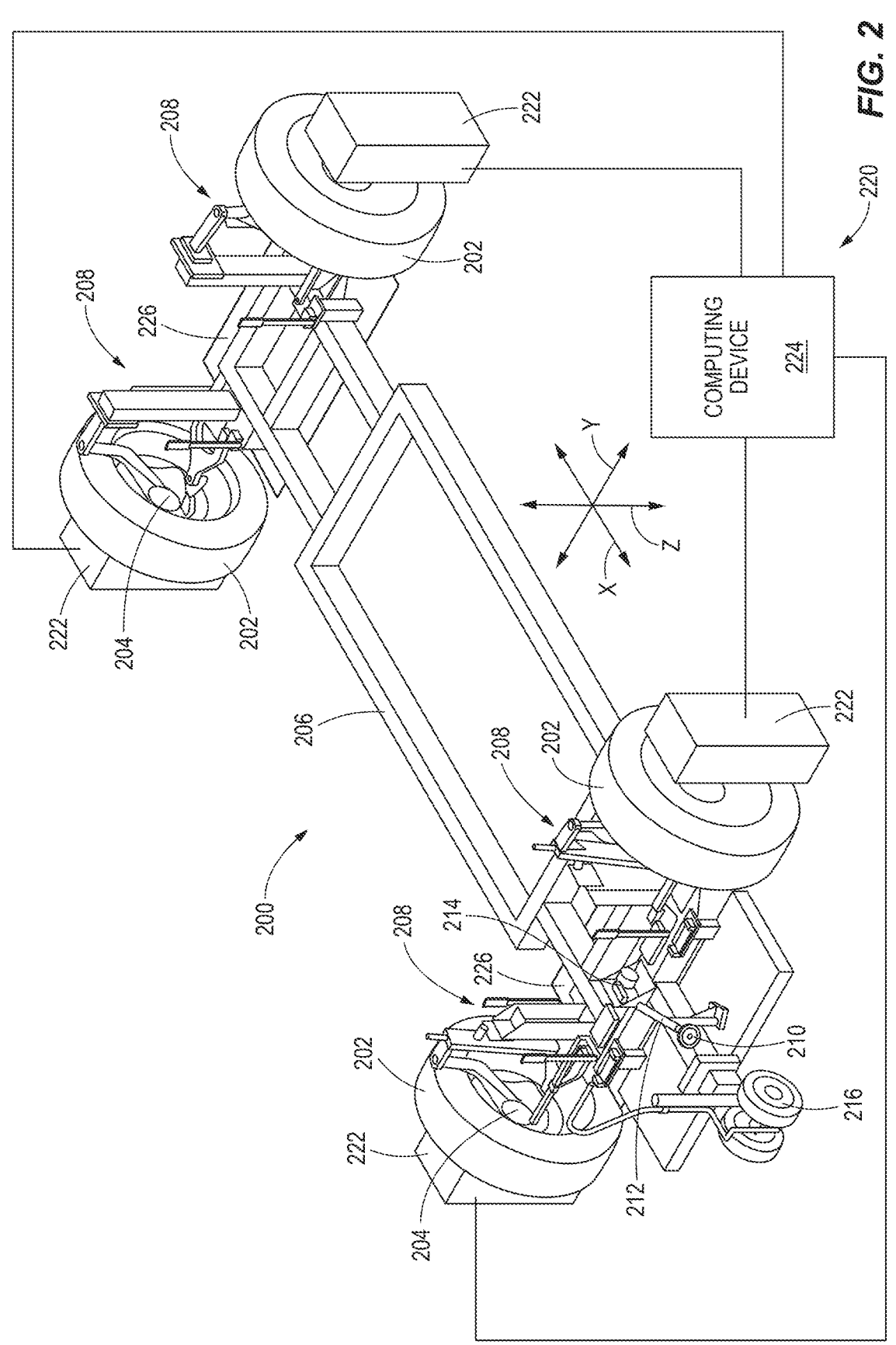
FIG. 2 illustrates an alignment gauge fixture positioned in a sensor station in accordance with certain embodiments.

FIG. 2 illustrates an alignment gauge fixture 200 that may be used to calibrate a sensor station. The alignment gauge fixture 200 may include wheels, such as the illustrated four wheels 202, such as a front pair of a wheels and a rear pair of wheels. At least one pair of wheels 202, such as the front pair of wheels, are steered wheels 202. Each wheel 202 may be mounted to a steering knuckle 204 that defines a point of attachment for the wheel (e.g., a hub 116 maybe defined on the steering knuckle 204) and a point of attachment to a chassis 106 of a vehicle. The steering knuckle 204 may be a conventional steering knuckle, e.g., the steering knuckle of a production vehicle for which the alignment gauge fixture 200 facilitates calibration or some other vehicle. In the examples discussed below, wheels 202 are secured to each steering knuckle 204 and the alignment of the wheels 202 is measured. However, in other applications, wheels 202 are not present and the alignment of the steering knuckle 204 is measured in a like manner.

The alignment gauge fixture 200 may include a chassis 206. The chassis 206 may include a frame made of rigid structural members, such as steel beams or panels or members made of other rigid metal, plastic, or composite material. Each steering knuckle 204 may be part of an adjustment assembly 208 that is secured to the chassis 206. The adjustment assembly 208 provides adjustable mounting of the steering knuckle 204 to the chassis 206 and provides adjustment of one or both of toe angle T and camber angle CM of the steering knuckle 204 and wheel 202 mounted to that adjustment assembly. For steered wheels 202, the corresponding adjustment assembly 208 may further provide adjustment of caster angle CS. As discussed in greater detail below, the adjustment assembly 208 enables the steering knuckle 204 and wheel 202 secured thereto, to be locked in a selected state (e.g., values for T, CM, and possibly CS) and enables reading the state from the adjustment assembly 208.

In some embodiments, measuring of the caster angle CS is performed by observing a steered wheel 202 while pivoting about at least a portion of the range of motion thereof about the pivot axis P, known as a caster sweep. For example, the caster sweep may include a rotation about the pivot axis P of at least 8 degrees. The caster sweep for steered wheels may be facilitated by a crank 210, lever, or other interface. The crank 210 may be coupled by a shaft 212 to an actuator 214. The actuator 214 is coupled to a pair of steered wheels 202 and rotates the steered wheels 202 about their corresponding pivot axes P responsive to rotation of the crank 210. The actuator 214 may be a circulating ball, rack and pinion or any other type of actuator used for steering a vehicle.

A jack 216 may secure to one end of the chassis 206 such that the jack 216 can lift one pair of wheels 202 from the ground. The jack 216 may include wheels and a handle such that the jack 216 may be used to move the alignment gauge fixture 200 to a desired position. The jack 216 may be rotated to disengage wheels of the jack from the ground (see FIG. 3) when performing measurements using the alignment gauge fixture 200. The jack 216 may be implemented according to any approach known in the art, e.g., a trailer jack, trailer valet, trailer dolly, or like structure.

The alignment gauge fixture 200 may be placed in a sensor station 220 and alignment of some or all of the wheels 202 may be measured (e.g., values for T, CM, and possibly CS). The sensor station 220 may include a sensor 222 for each wheel 202 that is configured to sense toe angle T and camber angle CM for a corresponding wheel 202. The sensor 222 for the steered wheels 202 may be configured to sense caster angle CS. The sensors 222 may be identical with measurements for caster angle CS being suppressed or ignored for non-steered wheels 202. The sensors 222 may be implemented using any approach known in the art for sensing alignment of wheels of a vehicle. For example, the sensors 222 may be light contour sensors that use lasers to measure alignment.

The sensors 222 may be coupled to a computing device 224 configured to cause the sensors 222 to perform measurements and to receive measurements of alignment from the sensors 222. Calibration of the sensors 222 may be performed using the computing device 224, e.g., readings from the sensors 222 may be modified according to calibration parameters to obtain the measurements of alignment for the wheels 202.

Figure 3:
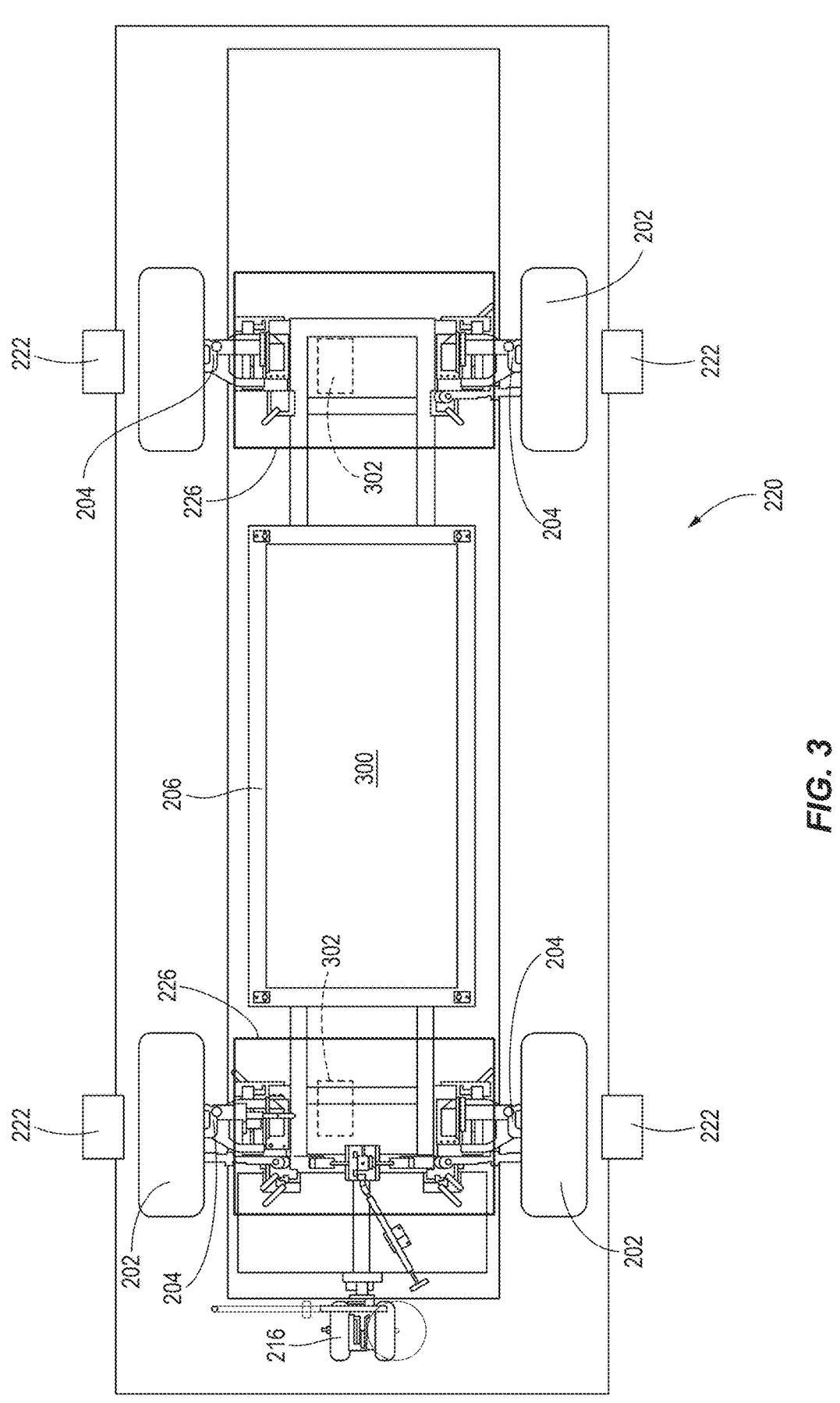
FIG. 3 is a top view of the alignment gauge fixture positioned in a sensor station in accordance with certain embodiments.

Referring to FIG. 3, while still referring to FIG. 2, the sensor station 220 may be positioned around a pit 300 and one or more distance sensors 302 may be mounted within the pit 300. For example, the one or more distance sensors 302 may be laser sensors. The alignment gauge fixture 200 may include plates 226 or other structures mounted thereto that facilitate measurement of ride height of the alignment gauge fixture 200 using the distance sensor 302. There may be multiple distance sensors 302, e.g., one under each plate 226 or a single distance sensor 302 with the alignment gauge fixture 200 being moved relative to the single sensor 302 to position each plate 226 over the distance sensor 302. In the illustrated embodiment, each plate 226 is positioned between a pair of wheels 202 and may have a length in the X direction approximately (e.g., within 5%) equal to the diameter of the wheels 202. The width of each plate 226 in the Y direction may be selected to permit free movement of the pair of wheels 202 about their corresponding pivot axis P within (a) a permitted range of steering angles for steered wheels (e.g., as defined for the corresponding production vehicle) and (b) a permitted range of toe angles T for non-steered wheels. The width of the plates 226 may be further reduced relative to the width sufficient to permit a range of motion, e.g., further by 2 to 10 centimeters, for example. A lower surface of each plate 226 may be selected to facilitate perception by the distance sensor 302, e.g., having a color or reflectivity facilitating detection by the distance sensor 302. Lower surfaces of each plate 226 may be substantially (e.g., within 0.1 degrees of) parallel to the X and Y directions.

Figures 4A, 4B:
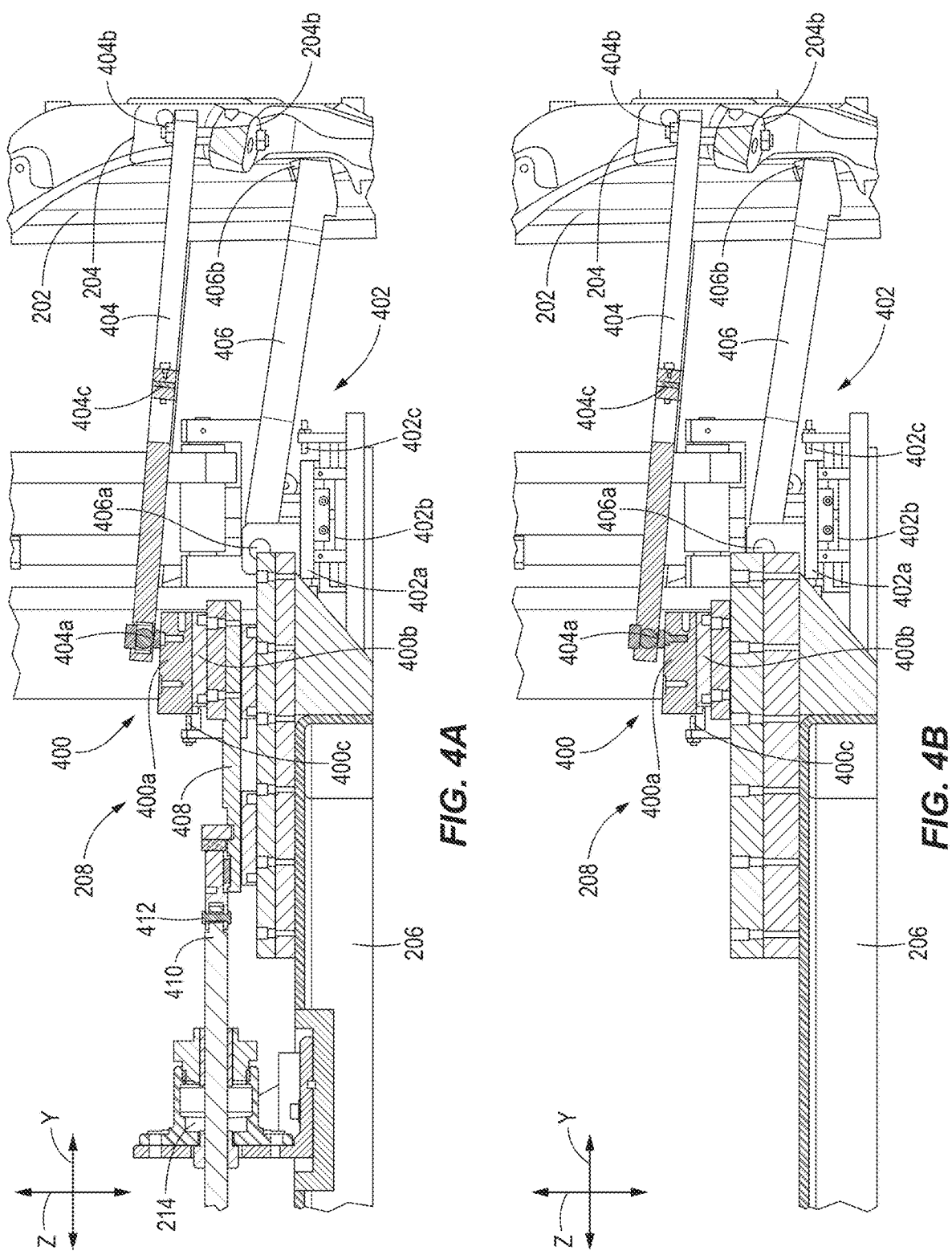
FIGS. 4A and 4B are front cross-sectional views of adjustment stages of the alignment gauge fixture in accordance with certain embodiments.

Referring to FIG. 4A, an adjustment assembly 208 may include a toe adjustment stage 400 and a camber adjustment stage 402. The toe adjustment stage 400 includes a sliding portion 400a and a stationary portion 400b. The camber adjustment stage 402 likewise includes a sliding portion 402a and a stationary portion 400b. The stationary portions 400b, 402b are mounted in fixed relation to the chassis 206, either directly or by way of one or more additional rigid members. The sliding portions 400a, 402a are constrained to slide primarily in the Y direction. As used herein "slide primarily" in a direction may be understood as allowing only insignificant play perpendicular to the direction (e.g., less than 0.01 degrees of rotation in a plane parallel to the direction) as required to permit sliding to occur. Sliding may be achieved by a rail on a stationary portion 400b, 402b engaging a slot in a sliding portion 400a,402a, respectively, or vice versa.

A tie rod 404 is connected to the steering knuckle 204 and to the sliding portion 400a. A lower control arm 406 is connected to the steering knuckle 204 and to the sliding portion 402b. The tie rod 404 is connected eccentrically relative to the axis of rotation of the wheel 202 and is in a position and arrangement analogous to the tie rod of a production vehicle that is used to transmit steering torque to a steered wheel. The lower control arm 406 permits relative motion and rotation of the steering knuckle in a plane as defined by the alignment of the steering knuckle 204. The lower control arm 406 is the analog of the lower control arm 406 of the suspension 120 of a production vehicle that enables upward movement of a wheel 202 in response to road disturbances.

The tie rod 404 may be connected to the sliding portion 400a by a ball joint 404a and to the steering knuckle 204 by a ball joint 404b. For example, the ball joint 404b may connect the tie rod 404 to the horizontal arm 204a of the steering knuckle 204. The length of the tie rod 404 may be adjustable using an adjustment mechanism 404c in order to precisely set the distance between the ball joints 404a, 404b.

The lower control arm 406 is connected to the sliding portion 402b by a pivot 406a and to the steering knuckle 204 by a ball joint 406b. The lower control arm 406 may be constrained by the pivot 406a to rotate primarily in the Y-Z plane, e.g., less than 0.1 degrees of out of plane rotation.

The ball joints 404a,404b, 406b and the pivot 406a are preferably rigid joints. As used herein, a rigid joint is a joint that allows less than 0.1, less than 0.01, or less than 0.001 millimeters of translation between members connected by the joint. To that end, the ball joints 404a, 404b, 406b and the pivot 406a may lack an elastomeric bushing that is typically present in production vehicles to reduce transmission of vibration. Stated differently, the force transfer path from the sliding portion 400a to the steering knuckle 204 and from the sliding portion 402a to the steering knuckle 204 may be formed of components having a hardness of at least Shore D 60, 80, or 100, which could include some rigid plastics.

The range of motion of the sliding portions 400a, 402a may be adjusted using stops 400c, 402c, respectively. For example, the stops may include a bolt engaging the stationary portion 400b, 402b, respectively, and that can be threaded in or out to decrease or increase the range of motion of the sliding portion 400a, 402a.

For steered wheels, the adjustment assembly 208 may link the toe adjustment stage 400 to the actuator 214 for performing the caster sweep. In the illustrated embodiment, a sliding member 408 is slidably mounted to the chassis 206 and is configured to primarily slide in the Y direction. The stationary portion 400b may be fixedly mounted to the sliding member 408. An actuated shaft 410 of the actuator 214 may be connected to the sliding member 408. In the illustrated embodiment, the shaft 410 is connected to the sliding member 408 by an adjustable coupler 412. The adjustable coupler 412 may be used to set a neutral position for the toc adjustment stage 400. The illustrated embodiment, the adjustable coupler 412 is implemented as an internally threaded collar that is rotatable relative the sliding member 408 and which engages a threaded portion on the actuated shaft 410.

FIG. 4A illustrates the adjustment assembly 208 for one side of the alignment gauge fixture 200. Steered wheels may be present in pairs, e.g., a pair of steered front wheels 202 and/or a pair of steered rear wheels 202, that are connected to the same actuator 214. Accordingly, a mirrored adjustment assembly 208 may be present on the other side of the alignment gauge fixture 200. The sliding members 408 of both mirrored adjustment assemblies 208 may be coupled to the same actuator 214, e.g., to opposite ends of the shaft 410. In some embodiment, the adjustable coupler 412 is present in the adjustment assembly 208 of only one wheel 202 of a pair of steered wheels.

Referring to FIG. 4B, for non-steered wheels, e.g., the rear pair of wheels, the sliding member 408, actuator 214, output shaft, and coupler 412 may be omitted. The stationary portion 400*b* may therefore be rigidly mounted relative to the chassis 206 either directly or by way of one or more other components. Accordingly, adjustment of toe angle T and camber angle CM is enabled, but performance of a caster sweep is not.

Figure 5:
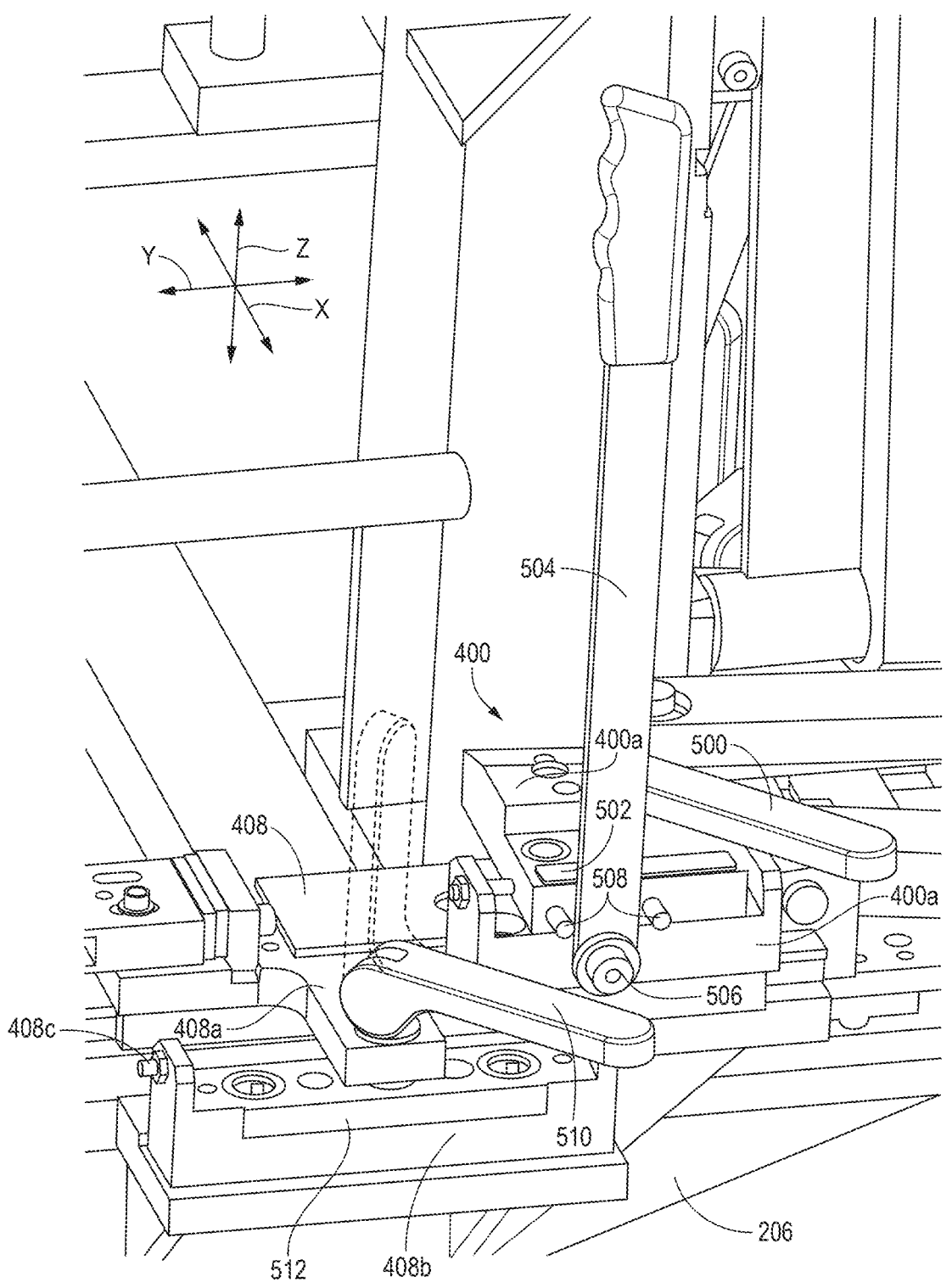
FIG. 5 is an isometric view of a toe adjustment stage for steered wheels in accordance with certain embodiments.

Referring to FIG. 5, the toe adjustment stage may include a locking mechanism 500 that is used to lock the sliding portion 400*a* relative to the stationary portion 400*b* in one of a plurality of discrete positions or within a range of possible positions. An indicator 502 may be secured to or otherwise present on the sliding portion 400*a* or the stationary portion 400*b* to enable an operator to determine the state of the sliding portion 400*a*, e.g., a toe angle T corresponding to the state of the sliding portion 400*a* or a value that may be used to derive the toe angle T. A detailed description of an example implementation of the locking mechanism 500 and the indicator 502 for the toc adjustment stage 400 is described below with respect to FIGS. 8A and 8B.

Sliding the sliding portion 400*a* may be facilitated by a lever 504. The lever 504 may be attached by pivot 506 to the stationary portion 400*b* and positioned between pins 508 secured to the sliding portion 400*a* and extending outwardly therefrom, e.g., protruding substantially parallel (e.g., within 5 degrees of) parallel to the X direction in the illustrated embodiment. The axis of rotation defined by the pivot 506 may likewise extend substantially parallel (e.g., within 5 degrees of) parallel to the X direction. A gap between the pins 508, e.g., in the Y direction) may be greater than the width of the lever 504 in the Y direction when the lever 504 is oriented parallel to the Z direction, thereby enabling a range of motion of the lever 504 about the pivot 506. Engagement of the lever 504 with a pin 508 may be used to induce movement of the sliding portion 400*a*.

In some embodiments, the sliding member 408 may be selectively locked relative to the chassis 206, such as when measuring toe angle T such that a caster sweep is not needed. In some embodiments, the adjustment assembly may include a locking mechanism 510 that may be used to lock the sliding member 408 relative to the chassis 206. The locking mechanism 510 may engage a protrusion 408*a* extending outwardly from the sliding member 408, e.g., in the Y direction and a stationary portion 408*b* rigidly mounted to the chassis 206. An adjustable stop 408*c* may be mounted to the stationary portion 408*b* to enable adjustment of a range of motion of the protrusion 408*a* relative to the stationary portion 408*b*. For example, the adjustable stop 408*c* may include a bolt engaging the stationary portion 408*b* and that can be threaded in or out to decrease or increase the range of motion of the protrusion 408*a*. An indicator 512 may be formed on or secured to the stationary portion 408*b* to enable an operator to read the state of the sliding member 408, e.g., a toe angle T amount in addition to a toe angle adjustment indicated by the indicator 512. The locking mechanism 510 and indicator 512 may likewise be implemented using the approach described below with respect to FIGS. 8A and 8B.

Figure 6:
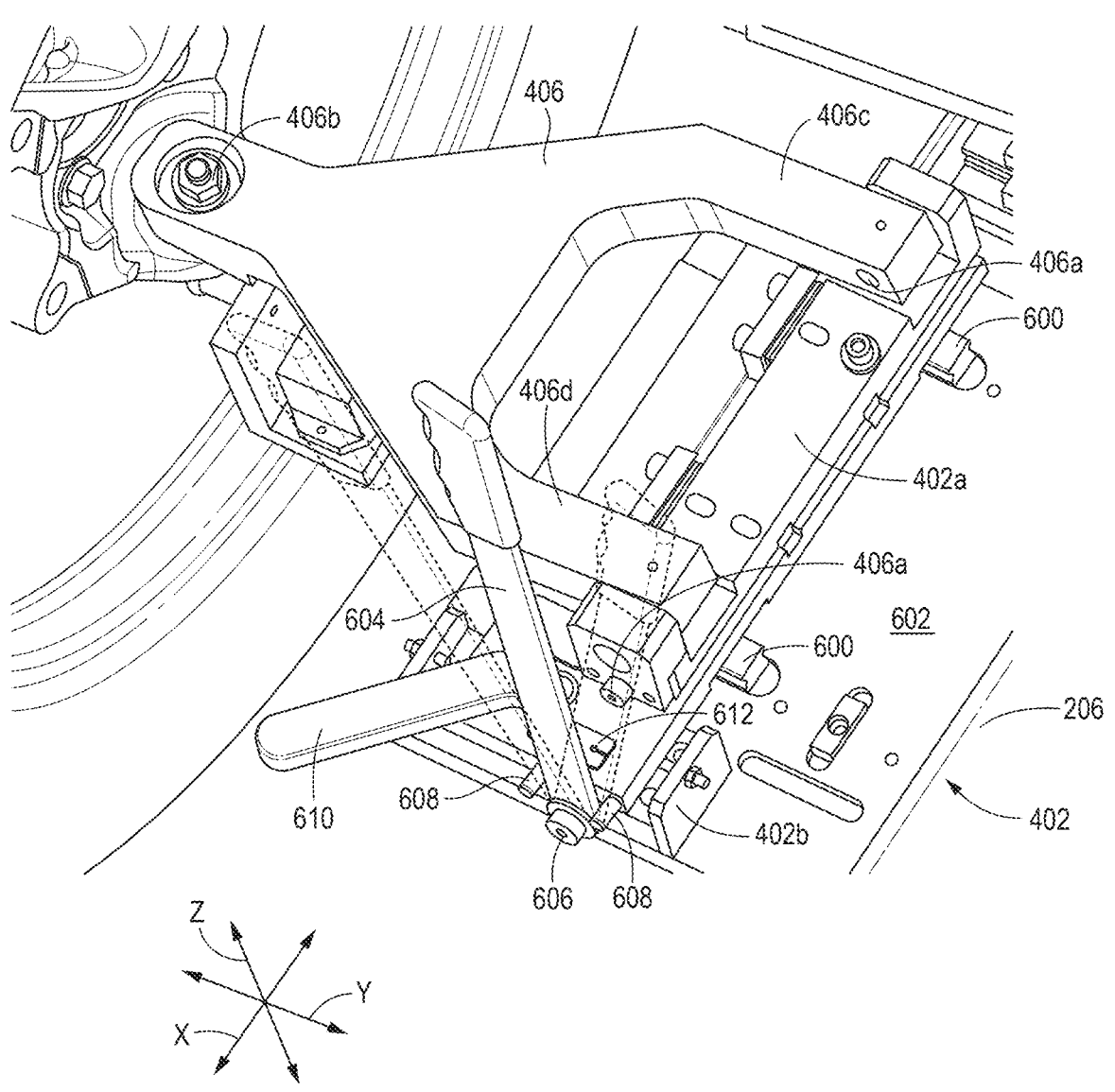
FIG. 6 is an isometric view of a camber adjustment stage in accordance with certain embodiments.

FIG. 6 illustrates an example implementation of the camber adjustment stage 402. As is apparent in FIG. 6, the lower control arm 406 may have a branched structure with prongs 406*c*, 406*d* that are offset along the Y direction to facilitate constrained rotation of the lower control arm 406 in the Y-Z plane. Accordingly, the sliding portion 402*a* may be correspondingly elongated in the X direction. The camber adjustment stage 402 may include rails 600 extending in the Y direction that engage the sliding portion 402*a* and constrain the sliding portion 402*a* to primarily slide in the Y direction. In the illustrated embodiment, the rails 600 are mounted to a plate 602 that is mounted to the chassis 206 either directly or indirectly. The stationary portion 402*b* may likewise mount to the plate 602 with only a portion of the length of the sliding portion 402*a* extending over the stationary portion 402*b* in the Y direction, e.g., less than 30, less than 25, or less than 15 percent of the length of the sliding portion 402*a* in the Y direction.

Sliding the sliding portion 402*a* may be facilitated by a lever 604. The lever 604 may be attached by pivot 606 to the stationary portion 402*b* and positioned between pins 608 secured to the sliding portion 402*a* and extending outwardly therefrom, e.g., protruding substantially (e.g., within 5 degrees of) parallel to the X direction in the illustrated embodiment. The axis of rotation defined by the pivot 606 may likewise extend substantially (e.g., within 5 degrees of) parallel to the X direction. A gap between the pins 608, e.g., in the Y direction) may be greater than the width of the lever 604 in the Y direction when the lever 604 is oriented parallel to the Z direction, thereby enabling a range of motion of the lever 604 about the pivot 606. Engagement of the lever 604 with a pin 608 may be used to induce movement of the sliding portion 402*a*.

The camber adjustment stage 402 may include a locking mechanism 610 that is used to lock the sliding portion 402*a* relative to the stationary portion 402*b* in one of a plurality of discrete positions or within a range of possible positions. An indicator 612 may be secured to or otherwise present on the sliding portion 402*a* or the stationary portion 402*b* to enable an operator to determine the state of the sliding portion 402*a*, e.g., a camber angle CM corresponding to the state of the sliding portion 402*a* or a value that may be used to derive the camber angle CM. A detailed description of an example implementation of the locking mechanism 610 and the indicator 612 for the camber adjustment stage 402 is described below with respect to FIGS. 8A and 8B.

Figure 7A:
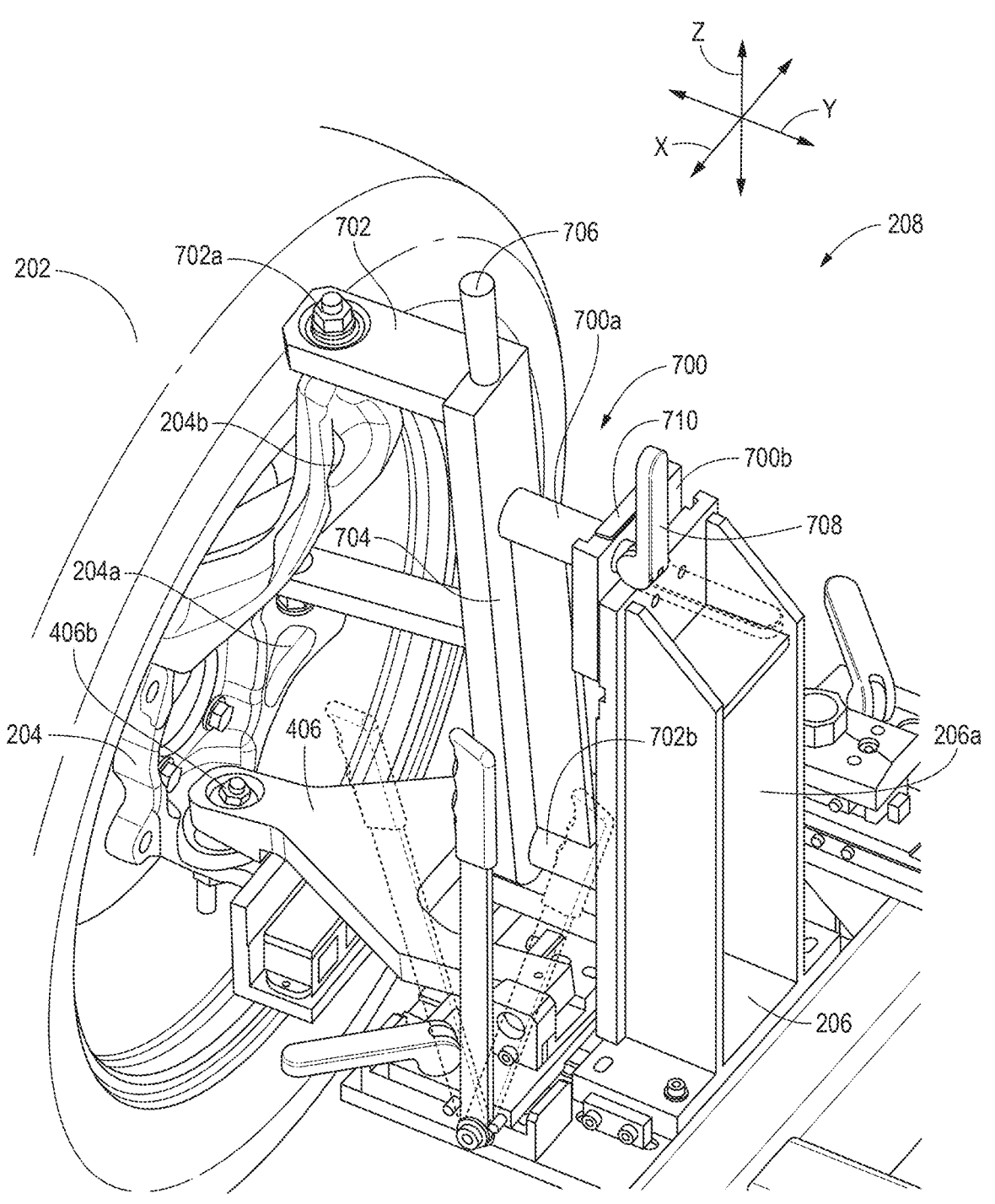
FIG. 7A is an isometric view of a caster adjustment stage in accordance with certain embodiments.

FIG. 7A illustrates an example caster adjustment stage 700 that may be included in the adjustment assembly 208 for a steered wheel 202. The caster adjustment stage 700 may include a rotating portion 700*a* and a stationary portion 700*b*. The rotating portion 700*a* may be connected to an upper control arm 702 that connects to a vertical arm 204*b* of the steering knuckle 204, such as using a ball joint 702*a* that is a rigid joint as defined above.

The control arm 702 may be an analog to the upper control arm of the suspension 120 of a production vehicle in terms of constraining the position of the upper end of the vertical arm 204*b*. However, in the illustrated embodiment, the control arm 702 does not pivot in the Y-Z plane as would the upper control arm of a production vehicle.

The upper control arm 702 may instead pivot about a pivot 702*b* that pivots about an axis of rotation that is substantially (e.g., within 0.1 degrees of) parallel to the Y direction. The upper control arm 702 may be secured to a pivot arm 704 that extends between the upper control arm 702 and the pivot 702*b* such that the upper control arm 702 (e.g., defined by the position of the ball joint 702*a*) is offset from the pivot 702*b* in the Z direction by a substantial distance, such as at least 50, 70, 80, or 90 percent of a distance between the ball joint 406*b* and the ball joint 702*a*, e.g., between centers of rotation defined by the ball joints 406*b*, 702*a*.

The rotating portion 700*a* may secure to the pivot arm 704, such as at a position between the control arm 702 and the pivot 702*b*. A pillar 206*a* extending upwardly from the chassis 206 in the Y direction may position the stationary portion 700*b* in the Y direction to engage the rotating portion 700*a*. The pivot arm 704 may also be pivotably mounted to the pillar 206*a* or to some other structure on the chassis 206.

A handle 706 may be secured to the control arm 702 or pivot arm 704 for grasping by an operator when adjusting the caster angle CS. In the illustrated embodiment, the handle 706 extends upwardly in the Z direction from the pivot arm 704, though an orientation generally parallel to the Y direction is also possible.

The caster adjustment stage 700 may include a locking mechanism 708 that is used to lock the rotating portion 700*a* relative to the stationary portion 700*b* in one of a plurality of discrete positions or within a range of possible positions. An indicator 710 may be secured to or otherwise present on the rotating portion 700*a* or the stationary portion 700*b* to enable an operator to determine the state of the rotating portion 700*a*, e.g., a caster angle CS corresponding to the state of the rotating portion 700*a* or a value that may be used to derive the caster angle CS. A detailed description of an example implementation of the locking mechanism 708 and the indicator 710 for the caster adjustment stage 700 is described below with respect to FIGS. 8A and 8B.

Figure 7B:
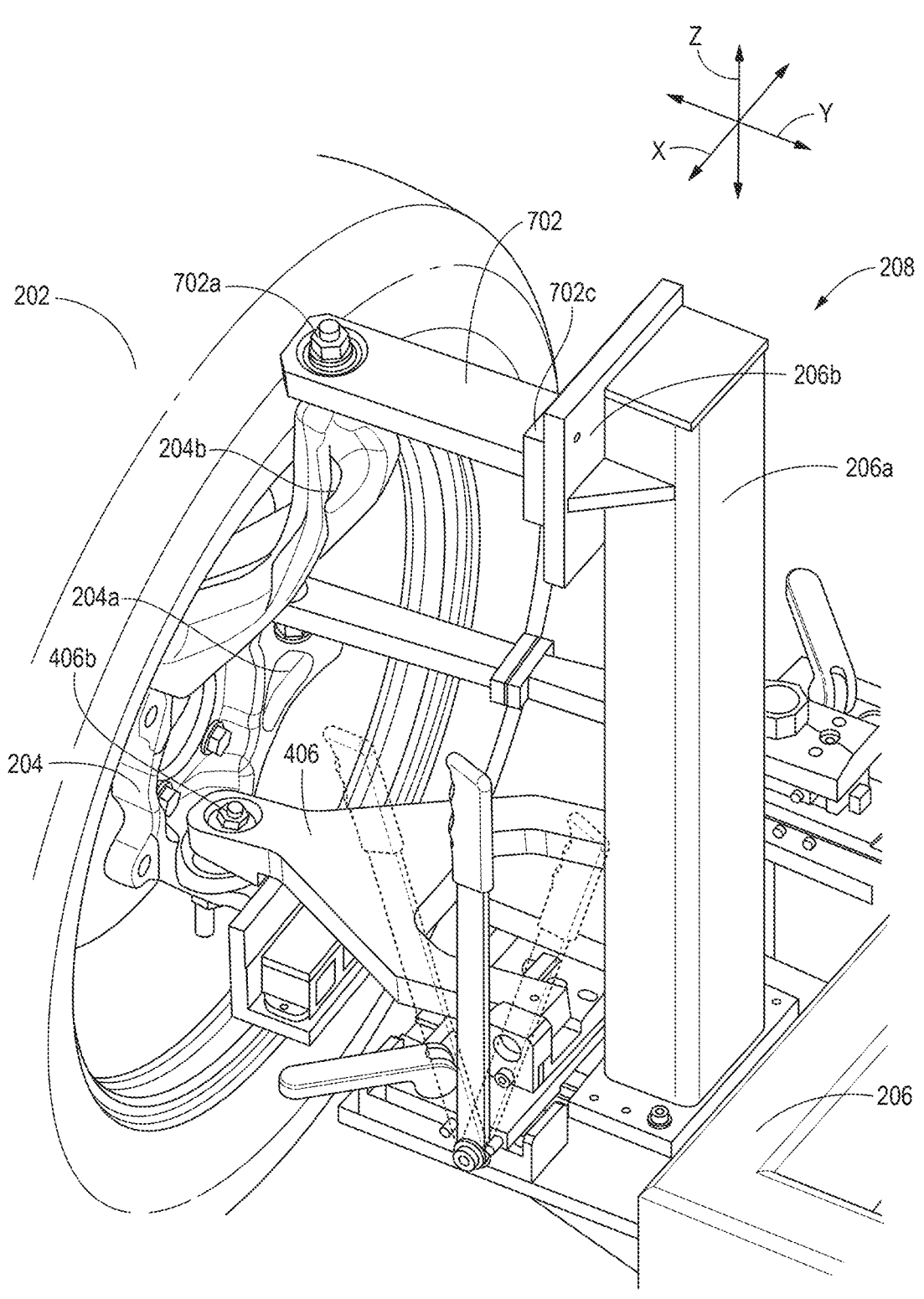
FIG. 7B is an isometric view of an adjustment assembly lacking a caster adjustment stage in accordance with certain embodiments.

Referring to FIG. 7B, for non-steered wheels 202, the corresponding adjustment assembly may lack a caster adjustment stage 700. The upper control arm 702 may instead be rigidly mounted to the chassis 206. For example, in the illustrated embodiment, a flange 702*c* is secured to the upper control arm 702 and is fastened to a corresponding flange 206*b* mounted to the pillar 206*a*.

Figure 8A:
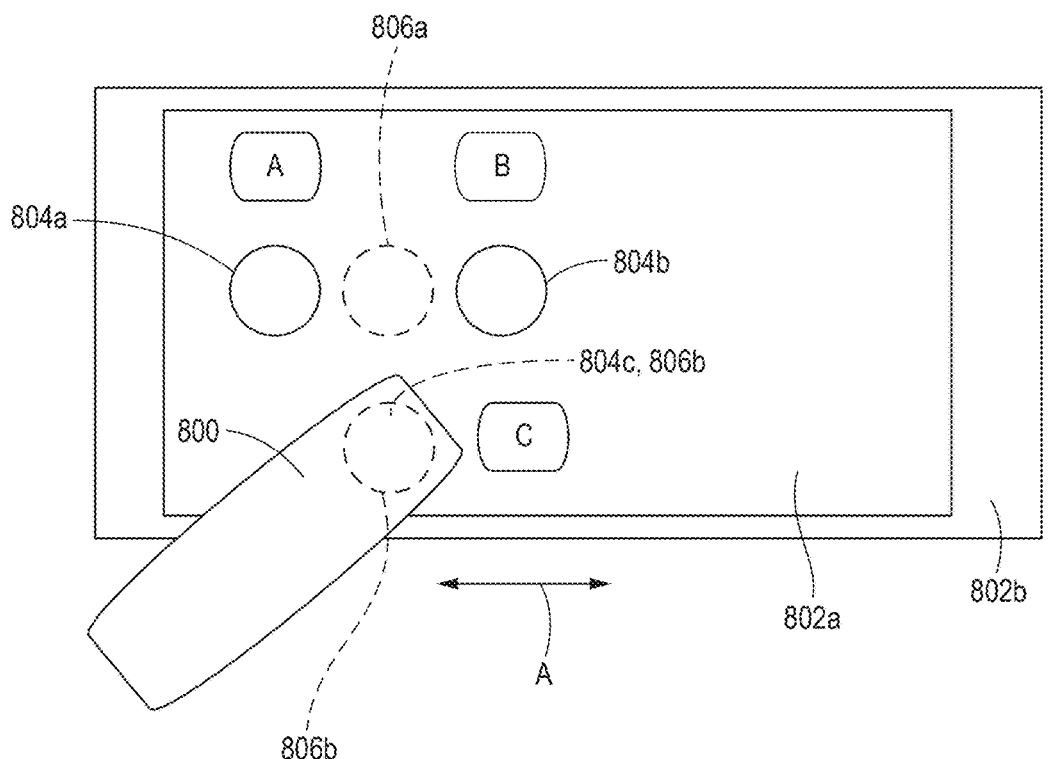
FIGS. 8A and 8B are schematic representations of a locking mechanism and indicator for an adjustment stage in accordance with certain embodiments.
Figure 8B:
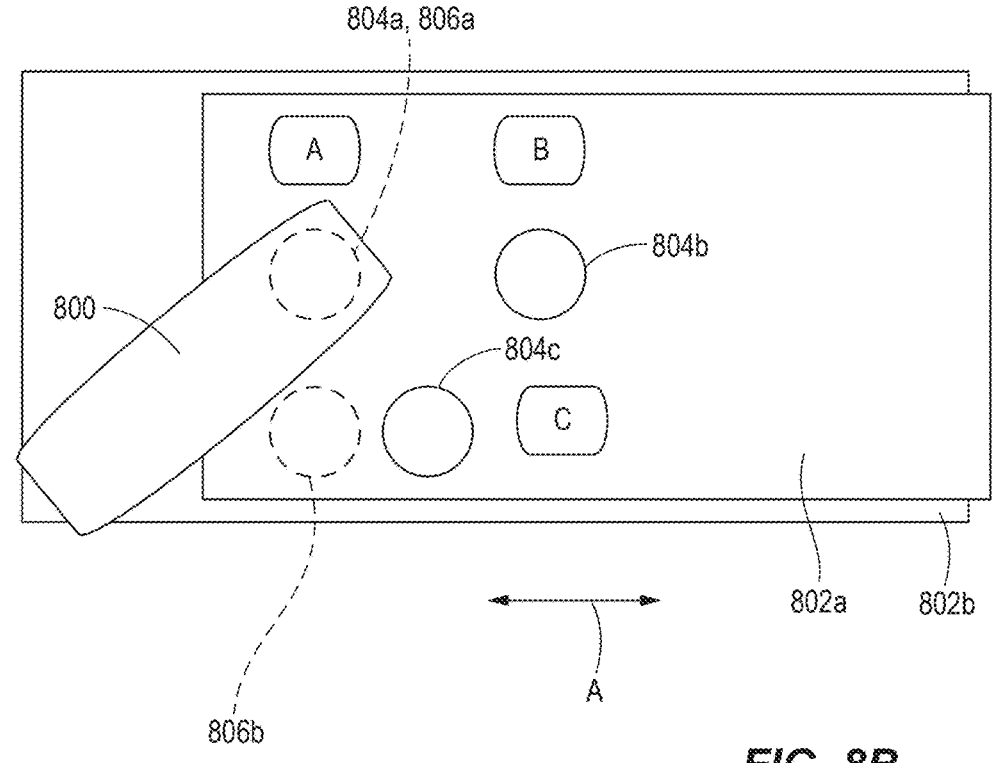

FIGS. 8A and 8B illustrate an example approach for implementing a locking mechanism 510, 610, 708 described above. The locking mechanism may include a lockout pin 800, e.g., a pin that can be inserted into a blind hole and locked therein, such as by engaging threads in the hole or other approach. For example, the lockout pin 800 may include a quick release lockout pin including a threaded portion and a cam portion and lever for placing tension on the threaded portion without the need for tools. However, any lockout pin or other type of locking pin may be used.

A moving portion 802*a* of an adjustment stage (e.g., a sliding portion 400*a*, 400*b* or rotating portion 700*a*) may define openings 804*a*, 804*b*, 804*c* at various positions along an adjustment direction A, e.g., the Y direction for the toe adjustment stage 400 and the camber adjustment stage 402 or a rotational direction about an axis parallel to the Y direction for the caster adjustment stage 700. The openings 804*a*, 804*b*, 804*c* may be colinear (or on a common arc about the pivot axis of the pivot 702*b*), as shown by openings 804*a*, 804*b* or may be offset from one another perpendicular to the adjustment direction A, such as to achieve a smaller difference in position along the adjustment direction A than is permitted by the diameters of the openings 804*a*, 804*b*, 804*c*. Each opening 804*a*, 804*b*, 804*c* may have a corresponding indicator A, B, C, respectively. The indicator may uniquely label the opening 804*a*, 804*b*, 804*c* and may further indicate a value, e.g., a value for toe angle T, camber angle CM, or caster angle CS that is achieved when the lockout pin is engaged with that opening 804*a*, 804*b*, 804*c*.

A corresponding stationary portion 802*b* (e.g., stationary portion 400*b*, 400*b*, 700*b*) may define one or more openings 806*a*, 806*b*. Where the openings 804*a*, 804*b*, 804*c* are all colinear or on a common arc, there may be single opening 806*a*, otherwise multiple openings 806*a*, 806*b* are present. At least one opening 806*a*, 806*b* is positionable in alignment with each opening 804*a*, 804*b*, 804*c* for some relative position of the moving portion 802*a* relative to the stationary portion 802*b*. When the lockout pin is engaged with an opening 804*a*, 804*b*, 804*c* and an opening 806*a*, 806*b*, the value indicated by the indicator A, B, C for that opening

804*a*, 804*b*, 804*c* is achieved (e.g., within achievable tolerances, such as within a tolerance that is smaller than the confidence interval of the sensor used to measure that value in the sensor station 220). The openings 804*a*, 804*b*, 804*c* and the one or more openings 806*a*, 806*b* may be lined with hardened bushings to reduce wear and promote consistent positioning over the lifetime of the alignment gauge fixture 200.

Figure 9:
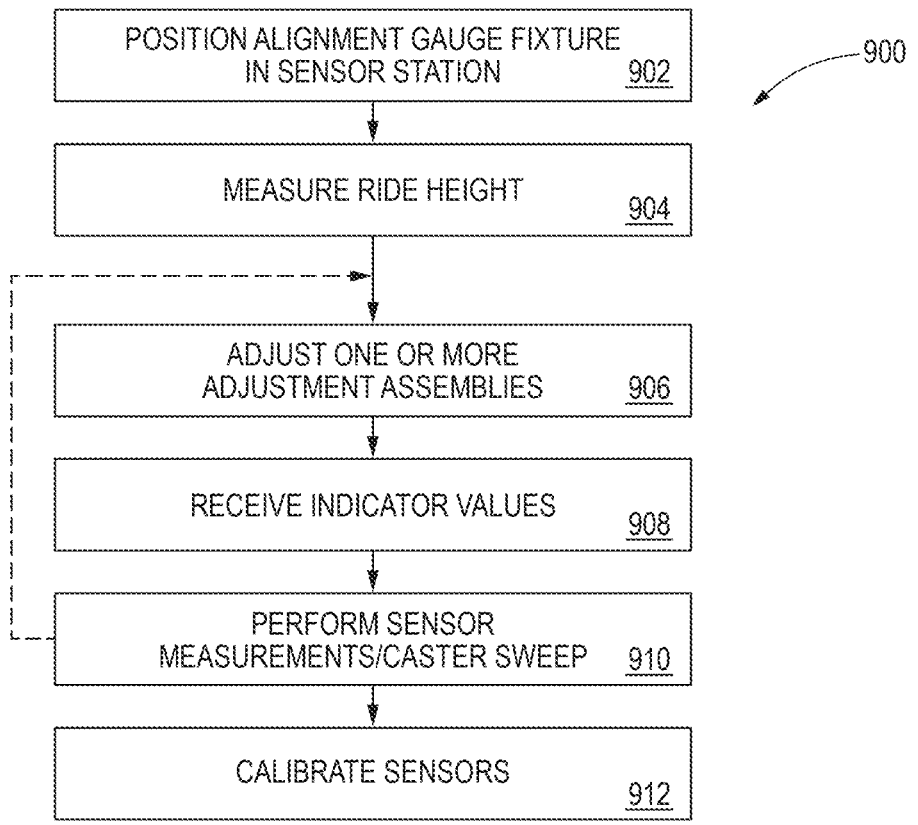
FIG. 9 is a process flow diagram of a method for using the alignment gauge fixture in accordance with certain embodiments.

FIG. 9 illustrates a method 900 that may be performed using the alignment gauge fixture 200 in order to calibrate a sensor station 220. The method 900 may be performed using the computing device 224 or other computing device.

The method 900 may include positioning, at step 902, the alignment gauge fixture 200 in the sensor station 220 at step 902, such as in the arrangement shown in FIGS. 2 and 3. Step 902 may include rolling the alignment gauge fixture 200 into the sensor station at step 902 and possibly centering the alignment gauge fixture 200 in the sensor station 220, e.g., along the X and Y directions, e.g., within some tolerance. Markings in the sensor station 220 may facilitate centering. Centering may place wheels 202 in an appropriate spatial relationship relative to the corresponding sensor 222 in the sensor station 220.

The ride height may be measured at step 904 using the distance sensors 302. The ride height measured at step 904 may be used as a reference value for other measurements of the alignment gauge fixture 200. The distance between a plate 226 and a support surface on which the alignment gauge fixture 200 is supported is a known distance, e.g., assuming a known pressure in wheels 202 and known or no significant wear on the wheels 202. Accordingly, the ride height measured at step 904 may be compared to this known distance to calibrate distance sensors, e.g., the distance sensor 302 and possibly the sensors 222.

The method 900 may include adjusting, at step 906, one or more adjustment assemblies 208. Step 906 may include adjusting some or all of toe angle T using the toe adjustment stage 400, adjusting camber angle CM using the camber adjustment stage 402, and/or the caster angle CS using the caster adjustment stage CS. During a first iteration of the method 900, step 906 may be performed before or after placing the alignment gauge fixture 200 in the sensor station 220. In subsequent iterations, step 906 may be performed while the alignment gauge fixture 200 is in the sensor station 220.

The method 900 may include reading and receiving the indicator values from the alignment gauge fixture 200 at step 908. For example, an operator may input values from some or all of the indicator 502, the indicator 512, the indicator 612 for each adjustment assembly 208 and the values from the indicator 710 for the adjustment assemblies 208 of steered wheels. As described above with respect to FIGS. 8A and 8B, reading an indicator value may include noting the label A, B, C adjacent an opening 804*a*, 804*b*, 804*c* in which a lockout pin 800 is inserted. In some embodiments, the computing device 224 assumes default values such that only values that differ from the default values are entered at step 908 such that step 908 may be omitted if the default values indicate the state of the alignment gauge fixture 200.

The method may include performing sensor measurements at step 910. Step 910 may include measuring toe angle T and camber angle CM for each wheel 202 using the sensors 222. Step 910 may include performing a caster sweep (e.g., using the actuator 214) while measuring caster angle CS. The measurements of T and CM may be performed at the same time as measuring caster angle CS or may be measured at different times, e.g., measured before or after performing the caster sweep.

The method 900 may include performing steps 906, 908, 910 one or more times for one or more additional combinations of values for toe angle T, camber angle CM, and caster angle CS (for steered wheels) for one or more adjustment assemblies 208. Performing steps 906, 908, 910 multiple times may enable the sensors 222 to be calibrated across a range of potential values for toe angle T, camber angle CM, and caster angle CS (for steered wheels), which enables more precise calibration. The range of adjustment of toe angle T, camber angle CM, and caster angle CS (for steered wheels) provided by the adjustment assemblies 208 may be larger than a range of values expected for production vehicles, e.g., a range of values provided by adjustment points of the production vehicles, such that the accuracy of the sensors 222 can be calibrated and verified for many possible scenarios.

At step 912, the indicator values from step 908 and the measurements from step 910 for each iteration may be used to calibrate the sensors 222. For example, parameters used by the computing device 224 to convert raw readings of the sensors 222 to measurements of toc angle T, camber angle CM, and caster angle CS may be adjusted such that the indicator values of step 908 will result from applying the parameters to raw readings obtained at step 910.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a one or more computer processing devices. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A gauge fixture comprising:
a chassis; and
a plurality of adjustment assemblies mounted to the chassis and each comprising:
a steering knuckle configured to mount a wheel;
a first member, a first end of the first member being mounted to the steering knuckle; and
an adjustment stage mounted to the chassis, a second end of the first member being mounted to the adjustment stage, the adjustment stage configured to adjust a position of the second end of the first member relative to the chassis to change alignment of the steering knuckle relative to the chassis, the adjustment stage including an indicator indicating a position of the second end of the first member relative to the chassis.

2. The gauge fixture of claim 1, wherein:
the first member is a control arm having a first end of the control arm mounted to the steering knuckle; and
the adjustment stage is a camber adjustment stage configured to change a camber angle the steering knuckle.

3. The gauge fixture of claim 2, wherein the control arm is a lower control arm.

4. The gauge fixture of claim 3, wherein at least a portion of the plurality of adjustment assemblies further include:
an upper control arm having a first end of the upper control arm mounted to the steering knuckle; and a caster adjustment stage mounted to the chassis and to a second end of the upper control arm, the caster adjustment stage configured to adjust a position of the second end of the upper control arm relative to the chassis to change a caster angle of the steering knuckle, the caster adjustment stage including a caster indicator enabling a position of the second end of the upper control arm relative to the chassis to be observed.

5. The gauge fixture of claim 4, wherein the caster adjustment stage includes a pivot arm pivotally mounted to the chassis, the second end of the upper control arm being mounted to the pivot arm.

6. The gauge fixture of claim 4, further comprising:

an actuator mounted to the chassis and coupled to a slide slidably mounted to the chassis;

wherein at least a portion of the plurality of adjustment assemblies further comprise:

a tie rod, a first end of the tie rod being mounted to the steering knuckle; and a toe adjustment stage mounted to the slide, a second end of the tie rod being mounted to the toe adjustment stage, the toe adjustment stage configured to adjust a position of the second end of the tie rod relative to the chassis to change toe angle of the steering knuckle, the toe adjustment stage including a toe indicator enabling a position of the second end of the tie rod relative to the chassis to be observed.

7. The gauge fixture of claim 6, wherein the toe adjustment stage further includes a locking mechanism configured to lock the second end of the tie rod relative to the slide.

8. The gauge fixture of claim 7, wherein:

the first end of the tie rod, the first end of the lower control arm, and the first end of the upper control arm are mounted to the steering knuckle without any intervening elastomeric bushing.

9. The gauge fixture of claim 1, wherein the first member is a tie rod, and the adjustment stage is a toe adjustment stage configured to adjust a toe angle of the steering knuckle.

10. The gauge fixture of claim 9, wherein the toe adjustment stage includes a first portion mounted to the chassis and a second portion mounted to the second end of the tie rod, the indicator being a label mounted to the second portion.

11. The gauge fixture of claim 10, wherein the toe adjustment stage includes a locking mechanism configured to lock the first portion relative to the second portion.

12. A method for alignment sensor testing, the method comprising:

positioning a gauge fixture relative to one or more wheel alignment sensors, the gauge fixture including:

a chassis;

a plurality of wheels mounted to the chassis; and for each wheel of the plurality of wheels:

a steering knuckle mounted to the each wheel;

a first member, a first end of the first member being mounted to the steering knuckle; and an adjustment stage mounted to the chassis, a second end of the first member being mounted to the adjustment stage, the adjustment stage configured to adjust a position of the second end of the first member relative to the chassis to change alignment of each wheel included in the plurality of wheels relative to the chassis, the adjustment stage including an indicator indicating a position of the second end of the first member relative to the chassis;

adjusting the position of the second end of the first member relative to the chassis for one or more wheels of the plurality of wheels;

reading the indicator to obtain a measurement for each wheel of the one or more wheels;

measuring the plurality of wheels using the one or more wheel alignment sensors to obtain measurements; and calibrating the one or more wheel alignment sensors according to the measurements.

13. The method of claim 12, wherein the one or more wheel alignment sensors include a toe angle sensor, a camber angle sensor, and a caster angle sensor.

14. The method of claim 13, wherein the adjustment stage for each wheel of the plurality of wheels is a toe adjustment stage configured to adjust toe angle, the gauge fixture including, for each wheel of the plurality of wheels, a camber adjustment stage, and, for each front wheel of the plurality of wheels, a caster adjustment stage.

15. The method of claim 14, wherein:

the gauge fixture comprises a slide mounted to the chassis and an actuator configured to translate the slide relative to the chassis, the toe adjustment stage of each front wheel of the plurality of wheels being mounted to the slide; and the method further comprises operating the actuator to rotate each front wheel about a steering pivot axis while measuring a caster angle of the each front wheel using the caster angle sensor.

16. The method of claim 15, further comprising locking the second end of the first member relative to the slide prior to operating the actuator.

17. The method of claim 14, wherein:

the first member is a tie rod; and the gauge fixture further comprises:

an upper control arm having a first end of the upper control arm connected to the steering knuckle and a second end of the upper control arm connected to the caster adjustment stage; and a lower control arm having a first end of the lower control arm connected to the steering knuckle and a second end of the lower control arm connected to the camber adjustment stage.

18. The method of claim 12, wherein the one or more wheel alignment sensors include at least one of a toe angle sensor, a camber angle sensor, or a caster angle sensor.

19. The method of claim 18, wherein the adjustment stage for each wheel of the plurality of wheels is configured to adjust at least one of toe angle, camber angle, and caster angle of each wheel included in the plurality of wheels.

20. A gauge fixture comprising:

a chassis;

a plurality of wheels mounted to the chassis; and for each wheel of the plurality of wheels:

a steering knuckle mounted to the each wheel;

a first member, a first end of the first member being mounted to the steering knuckle; and an adjustment stage mounted to the chassis, a second end of the first member being mounted to the adjustment stage, the adjustment stage configured to adjust a position of the second end of the first member relative to the chassis to change alignment of each wheel included in the plurality of wheels relative to the chassis, the adjustment stage including an indicator indicating a position of the second end of the first member relative to the chassis.

* * * * *